US006382899B1

(12) United States Patent
Cook

(10) Patent No.: US 6,382,899 B1
(45) Date of Patent: May 7, 2002

(54) MATERIAL-HANDLING VEHICLE

(75) Inventor: David Cook, Uttoxeter (GB)

(73) Assignee: J.C. Bamford Excavators Ltd., Staffordshire (GB)

( * ) Notice: Subject to any disclaimer, the term of this patent is extended or adjusted under 35 U.S.C. 154(b) by 62 days.

(21) Appl. No.: 09/661,868

(22) Filed: Sep. 14, 2000

(30) Foreign Application Priority Data

Sep. 16, 1999 (GB) ............................................. 9921800

(51) Int. Cl.[7] .................................................. E02F 3/39
(52) U.S. Cl. ...................................... 414/685; 180/374
(58) Field of Search .................................. 414/690, 680, 414/685, 718, 728; 180/374, 375, 376, 291, 292

(56) References Cited

U.S. PATENT DOCUMENTS

| 2,257,772 A | * 10/1941 | Wolf ........................ 180/292 X |
| 3,401,763 A | * 9/1968 | Rolt ......................... 180/374 X |
| 5,707,202 A | 1/1998 | Brown ......................... 414/685 |
| 5,836,733 A | 11/1998 | Moses et al. ................ 414/685 |

FOREIGN PATENT DOCUMENTS

| CA | 2009968 A | 8/1991 |
| DE | 240869 A1 | 11/1986 |
| EP | 656315 A1 | 6/1995 |
| EP | 692448 A1 | 1/1996 |
| GB | 2268155 A | 1/1994 |
| GB | 2317598 A | 4/1998 |
| GB | 2336819 A | 11/1999 |
| WO | WO 89/00972 | 2/1989 |

* cited by examiner

Primary Examiner—Donald W. Underwood
(74) Attorney, Agent, or Firm—MacMillan, Sobanski & Todd, LLC

(57) ABSTRACT

A material-handling vehicle includes a structure having ground engageable propulsion means, a loader arm mounted on the structure for up and down swinging movement and, on opposite sides of the loader arm, an operator's cab and an engine having an output to provide power for said movement of the loader arm and for propulsion of the vehicle and a drive to connect the output of the engine to the ground engageable propulsion means to propel the vehicle and wherein the drive includes an angle drive and a change speed gear train, the output of the engine is kinematically connected to an input of the angle drive and an output of the angle drive is kinematically connected to an input of the change speed gear train, and an output of the change speed gear train is kinematically connected to the ground engageable propulsion means wherein the output of the engine and the input of the angle drive are disposed longitudinally of the vehicle whilst the output of the angle drive is disposed transversely of the vehicle.

20 Claims, 7 Drawing Sheets

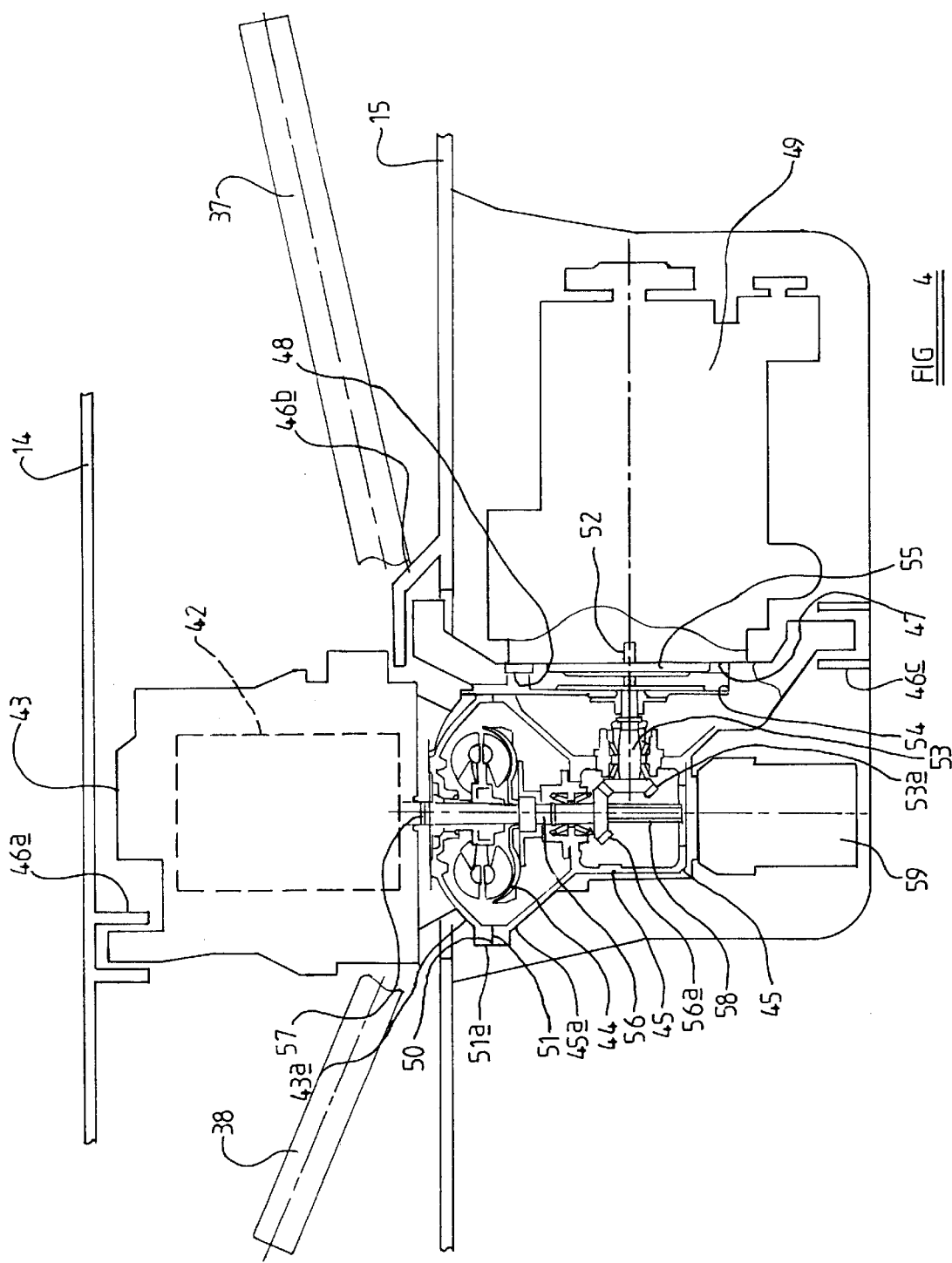

MATERIAL-HANDLING VEHICLE

BACKGROUND TO THE INVENTION

This invention relates to a material-handling vehicle of the kind, hereinafter referred to as the "kind specified", including a structure having ground engageable propulsion means, a loader arm mounted on the structure for up and down swinging movement and, on opposite sides of the loader arm, an operator's cab and an engine having an output to provide power for said movement of the loader arm and for propulsion of the vehicle and a drive to connect the output of the engine to the ground engageable propulsion means to propel the vehicle.

WO-A-89/00972, CA-A-2,009,968, EP-A-0,656,315, U.S. Pat. No. 5,836,733 disclose vehicles of the kind specified in which a loader arm, in a fully lowered position, is substantially horizontal, and is at least partly accommodated in a well disposed between the operator's cab and a housing in which the engine is disposed. The loader arm is disposed so it does not, at least substantially, interfere with the view of the operator in a direction over the top of the engine housing.

A vehicle configuration as disclosed in these three references, in which the engine is on the opposite side of the loader arm to the cab, enables the vehicle to be made smaller than would be the case where the engine is disposed beneath the loader arm and so enables the overall height of the vehicle to be reduced. It also enables a lower loader arm position to be achieved than would be the case if the engine were under the loader arm.

A side mounted longitudinally orientated engine connected by a hydrostatic drive is known from the vehicle produced commercially and the general layout of which is disclosed in WO-A-89/00972. CA-A-2,009,968 and GB-A-2268155 disclose a side mounted longitudinally orientated engine having a drive in which the gearbox is mounted directly to the engine or, in one embodiment of CA-A-2,009,968, the gearbox is mounted substantially on the longitudinal axis of the machine. The former arrangement leads a relatively long wheel base machine, whilst the latter requires a large and often complex transfer drive between the gearbox and the engine.

In EP-A-0,656,316 and DD-A-240869 and U.S. Pat. No. 5,836,733 the engine is disposed with its output transversely of the vehicle and an angle gear drive is provided to transfer drive through 90° from the engine to a gearbox from which drive is transmitted to the ground engageable means.

These vehicles suffer from the disadvantage that the length of the engine plus the width of the loader arm and of the cab define the machine width. If a wider cab or loader arm or a longer engine is desired then the machine overall width must be increased which may be undesirable.

The input of the change speed gear train may be disposed transversely of the vehicle.

SUMMARY OF THE INVENTION

An object of the present invention is to provide a material-handling vehicle of the kind specified whereby the above mentioned problems are overcome or are reduced.

According to the present invention we provide a material handling vehicle of the kind specified wherein the drive includes an angle drive and a change speed gear train, the output of the engine is kinematically connected to an input of the angle drive and an output of the angle drive is kinematically connected to an input of the change speed gear train, and an output of the change speed gear train is kinematically connected to the ground engageable propulsion means wherein the output of the engine and the input of the angle drive are disposed longitudinally of the vehicle whilst the output of the angle drive is disposed transversely of the vehicle.

The input of the change speed gear may be disposed transversely of the vehicle.

The output of the change speed gear train may be disposed transversely of the vehicle.

The drive means may include means for disconnecting the drive between the engine and the ground engageable propulsion means.

Said disconnecting means may be disposed between the engine and the angle drive or between the change speed gear train and the ground engageable propulsion means but is preferably between the angle drive and the change speed gear train.

The disconnecting means may comprise a mechanical clutch, such as a friction clutch, a fluid coupling or a torque converter or the like.

The engine may have a drive shaft which is disposed longitudinally of the vehicle.

The engine may be a reciprocatory engine and have a crankshaft which provides said drive shaft.

The change speed gear train may be disposed in a housing comprising a gearbox.

The angle drive and the change speed gear train may be disposed in at least one housing, the housing or housings comprising a transmission unit.

The vehicle may comprise a chassis having a pair of spaced longitudinally extending frame members.

The frame members may be parallel to each other.

At least one of the chassis frame members may be apertured or relieved locally to clear at least one of the engine, gearbox, transmission unit or associated component.

The transmission unit may be provided with at least one output which is kinematically connected to said ground engageable propulsion means.

The at least one output may be disposed on or parallel to a longitudinal axis of the vehicle.

The transmission unit may have a front output and a rear output.

Said outputs of the transmission unit may be provided at opposite ends of a shaft, which is driven by the output of the change speed gear train, and which is disposed longitudinally of the vehicle.

The output of the change speed gear train may be connected to an input of a further angle drive having an output which extends longitudinally of the vehicle.

The output of the change speed gear train may be connected to an input of a further angle drive having an output which is kinematically connected to said outputs of the transmission unit.

The output of the further angle drive may be disposed adjacent the engine.

The further angle drive may be disposed adjacent to the engine.

The vehicle may comprise a front axle and a rear axle each having a ground engageable propulsion means and the propulsion means of at least one of said axles being connected to said at least one output of the transmission unit.

At least one of said axles may have a differential which is connected to said at least one output of the transmission unit.

The connection of the or each output of the transmission unit to at least one of said axles may comprise a shaft which may have a universal joint at least at one end.

The change speed gear train may be disposed substantially within the chassis frame members and between the axes of rotation of the front and rear wheels of the vehicle.

The engine may be spaced from the cab to define a well between the cab and the engine in which the arm, in a lowered position, can be at least partly accommodated.

The well may be disposed between the chassis frame members.

The engine may be disposed in a housing.

The engine may be disposed substantially on the opposite side of the chassis to the cab.

Mounting means may be provided between the structure and at least one of the engine and transmission unit.

Mounting means may be provided between the structure and the transmission unit and the engine may be carried by the transmission unit.

A first mounting means may be provided between a first chassis frame member, which is adjacent the operator's cab and the transmission unit, a second mounting means may be provided between the other frame chassis member and the transmission unit and a third mounting means may be provided between a part of the structure and the transmission unit.

The mounting means may comprise compliant mounts.

The transmission unit may comprise an angle drive housing for said angle drive and a gearbox for said change speed gear train.

The gearbox may be disposed underneath the well.

The engine, angle drive housing and change speed gearbox may be rigidly connected together.

The angle drive housing may have a first mounting face, which faces longitudinally of the vehicle, to which a mounting face of the engine is connected, and a second mounting face, which faces transversely of the vehicle, to which a mounting face of the gearbox is connected.

The gearbox may have said first mounting means which may be disposed on the opposite side of the longitudinal axis of the vehicle to the engine.

The angle drive housing may have said second and third mounting means which may be disposed on transversely opposite sides of the axis of rotation of the output of the engine.

The longitudinal axis of the loader arm may extend forwardly in, or parallel to, a vertical plane containing a longitudinal axis of the vehicle.

The structure may have a front end and a rear end with said longitudinal axis of the vehicle extending therebetween and the ground engageable propulsion means being disposed equidistant from, and on opposite sides of, said longitudinal axis.

The loader arm may be pivotally mounted on the structure about a horizontal axis adjacent the rear of the vehicle.

The loader arm may carry a material handling implement at its front end so that the material handling implement is disposed in front of the front of the structure when the arm is in its lowermost position.

The cab may have a side window which faces transversely across the vehicle, preferably at right angles to the longitudinal axis of the loader arm.

The top of the loader arm in a fully lowered position and at a position alongside the top of a steering wheel in the operator's cab may be disposed wholly or substantially wholly below a horizontal plane which is not more than 1 meter, or preferably not more than 0.5. meter, above the top of the steering wheel so that the driver's vision is substantially unobstructed by the loader arm.

If desired, the top of the boom at said position may be wholly or substantially wholly below a horizontal plane containing the top of the steering wheel.

The loader arm may be telescopic in the direction of the longitudinal axis of the loader arm.

The longitudinal axis of the loader arm may be in a substantially horizontal plane when the loader arm is in a position in which the implement engages a horizontal plane on which the ground engageable propulsion means are supported and, if the loader arm is telescopic, the loader arm is fully retracted.

The engine may be disposed so that a major portion of the engine is situated below a plane tangent to the top of the ground engaging propulsion means so as not to interfere with the view of an operator working in the operator's cab.

The ground engageable propulsion means may comprise a pair of ground engageable wheels disposed adjacent the front of the structure and a pair of rear ground engageable wheels adjacent the rear of the structure.

The wheels of the front pair may be driven from the front output of the transmission whilst the wheels of the rear pair may be driven from the rear output of the transmission.

The ground engageable propulsion means may be driven from the engine wholly by a mechanical transmission or a hydrokinetic transmission.

The angle drive and/or the further angle drive may comprise first and second shafts disposed at an angle to each other, the first shaft being connected to or comprising the input shaft of the angle drive and the second shaft being connected to or comprising the output of the angle drive and the first and second shafts being connectable in torque transmitting relationship.

Said first and second shafts may connectable in said torque transmitting relationship by a bevel gear set.

The first and second shafts may be mutually inclined at 90°.

The angle drive and/or the front axle drive may comprise a first bevel gear mounted for rotation about an axis which extends longitudinally of the vehicle and which is in mesh with a second bevel gear which is mounted for rotation about an axis which extends transversely of the vehicle.

Damping means may be provided between the engine output and the drive to reduce engine induced vibrational resonance.

The present invention gives at least one of the following advantages.

An engine speed drive for a pump or pumps for hydraulic fluid for operating the loader arm for swinging movement up or down, and/or for telescoping the loader arm and/or for operating an implement carried by the loader arm. Such pump or pumps may be either transversely and/or longitudinally disposed so as to be driven by transversely and/or longitudinally disposed shafts of the angle drive.

If desired more than one pump may be provided and in this case one pump may be driven from the transversely orientated shaft of the angle drive, whilst a second pump may be driven by a longitudinally orientated shaft of the angle drive.

A compact drive train is achieved which can have a three point mounting providing a transmission unit which is rigidly connected to the engine which is carried in cantilever from the transmission unit.

If desired a cooling radiator for the engine may be disposed above the angle drive.

BRIEF DESCRIPTION OF THE DRAWINGS

The invention will now be described by way of example with reference to the accompanying diagrammatic drawings in which;

FIG. 4 is a fragmentary plan view, partly in section and to an enlarged scale, showing a transmission unit of the vehicle of FIG. 1.

DESCRIPTION OF THE PREFERRED EMBODIMENTS

Figure 1:
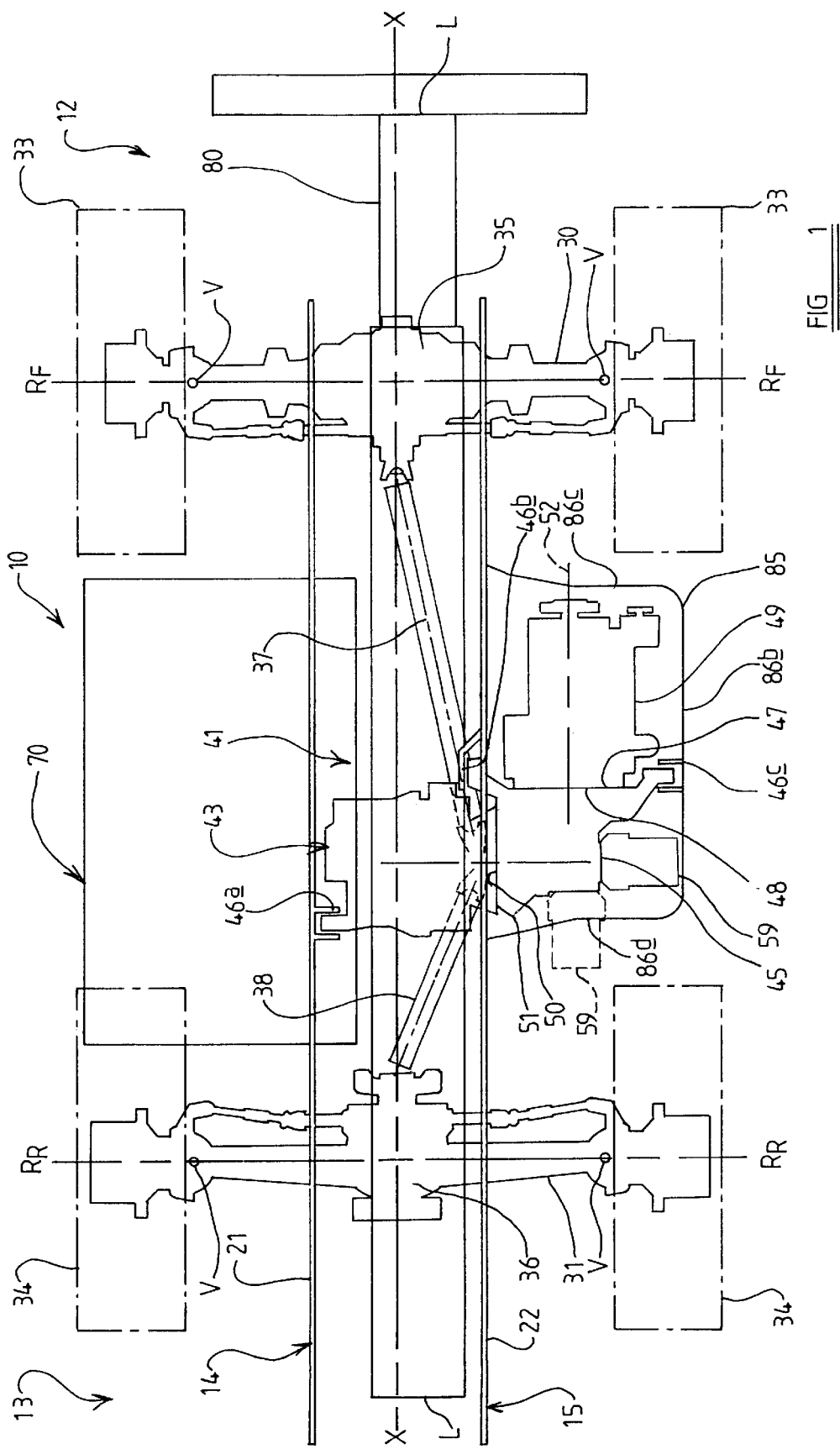
FIG. 1 is a fragmentary plan view, with parts omitted for clarity, of part of a telescopic loader vehicle embodying the invention.
Figure 2:
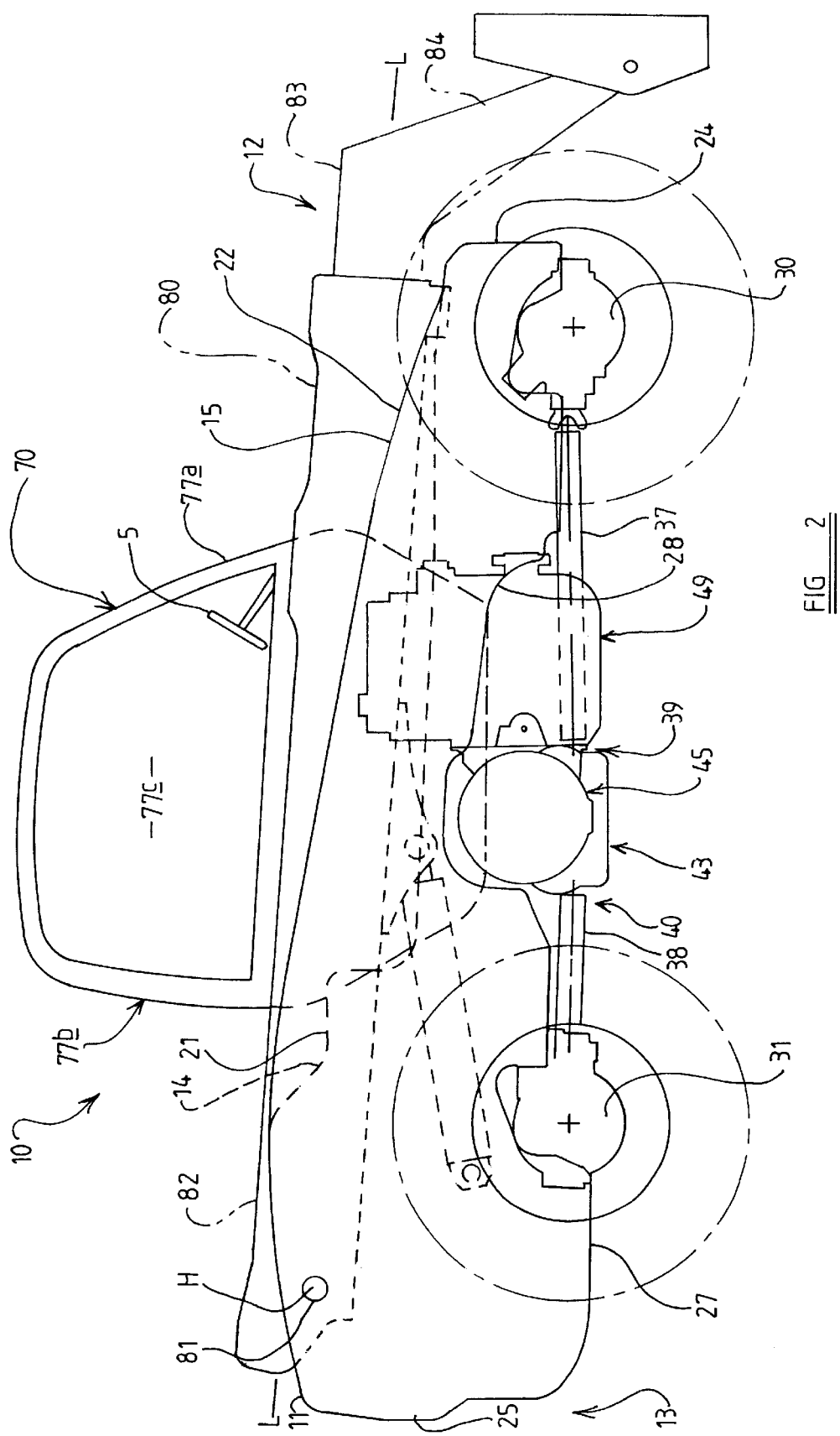
FIG. 2 is a fragmentary side elevation, with parts omitted for clarity, of the vehicle of FIG. 1.

Referring to the Figures, a material-handling vehicle is indicated generally at 10 and comprises a main structure 11 having a front end 12 and a rear end 13 with a longitudinal axis X—X extending between the front and rear ends. The structure 11 comprises a pair of spaced parallel frame members 14, 15 held in spaced parallel relationship by cross members.

Each frame member 14, 15 has a upper surface 21, 22 respectively. At the front and rear, the frame members 14, 15 have generally upright parts 24, 25 respectively whilst on their undersides they have a lower surface one of which is shown at 27. The right-hand frame member 15 has an upwardly relieved part 28 to provide clearance for an engine and a transmission unit as hereinafter to be described.

A front axle 30 is mounted on the frame members 14, 15 at the front end thereof whilst a rear axle 31 is mounted on the frame members 14, 15 towards the rear thereof. The axles 30, 31 are of conventional type carrying at their opposite ends front wheels 33 and rear wheels 34 respectively. Both the front wheels 33 and both rear wheels 34 are pivotable relative to their associated axis about a steering axis V for steering movement of the vehicle, If desired at least one of the axles may be mounted relative to the frame members 14, 15 for oscillation about a longitudinally extending axis. Each axle 30, 31 is provided with a differential 35, 36 respectively of conventional form, the differentials being driven by propeller shafts 37, 38 respectively from front and rear output couplings 39, 40 respectively of a transmission unit 41.

The transmission unit 41 incorporates a change speed gear train, shown in block diagrammatic form at 42, disposed in a gear box 43, a torque converter 44 and an angle drive in an angle drive housing 45. If desired the torque converter 44 may be omitted or other means for disconnecting drive when the vehicle is stationary may be provided, such as a mechanical clutch, for example, a friction clutch, or a fluid coupling.

The gearbox 43 is, in the present example, a power shift gearbox where the gears and direction of rotation of the change speed gear train are selected by solenoid controlled hydraulically actuated clutch packs. If desired, the gearbox may be of a type where the gear or direction of rotation of the change speed gear train is mechanically selected or a combination of mechanical and clutch pack selection may be used.

The change speed gear train 42, as best shown in FIGS. 4 to 9, has an output shaft 61a at the end thereof adjacent the angle drive housing 45, which has affixed, thereto to rotate therewith, a pinion 64a which meshes with a pinion 64b splined to an intermediate shaft 65 which has a first bevel gear 66 formed integrally therewith. The bevel gear 66 meshes with a second bevel gear 67 splined to a shaft 68 which is provided with the forward and rearward outputs 39, 40 respectively. The outputs 39, 40 are beneath the torque converter 44 and so are disposed at the end of the transmission to be adjacent to the engine. The shafts 65 and 68 are carried in the gearbox 43 by bearings 69a 69b respectively. The shaft 65, first bevel gear 66, second bevel gear 67 and shaft 68 provide an input shaft, meshed gears and an output shaft, respectively of a further angle drive which in the present example is disposed in the housing 45 which is part of the transmission unit.

The gearbox 43 is disposed essentially between the frame members 14, 15. A first mounting face 47 of the angle drive housing 45 is bolted to an opposed face 48 of an engine 49. A second mounting face 50 of the angle drive housing, disposed at right angles to the face 47, is bolted to an opposed mounting face 51 of the gearbox 43.

The transmission unit 41 is mounted on the frame members 14, 15 by three compliant mounts 46a–c. A first mount 46a is provided between the first frame member 14, which is adjacent the operator's cab, and the gearbox 43. A second mount 46b is provided between the second frame member 15 and the angle drive housing 45. A third mounting 46c is provided between a part projecting transversely from the frame member 15 and the angle drive housing 45 on the opposite of the longitudinal axis of the engine to the frame member 15. The engine 49 is supported in cantilever by virtue of the mounting face 48 of the engine being connected to the mounting face 47 of the angle drive housing 45.

The torque converter 44 may be disposed wholly or partly in the gearbox 43 or in the angle drive housing 45 or may be provided partially in each thereof Alternatively a separate housing may be provided for all or part of the torque converter 44 appropriately disposed between the gearbox 43 and the angle drive housing 45.

The engine 49 is, in the present example, a four cylinder engine having a crankshaft indicated diagrammatically at 52 which is rotatable about an axis which is parallel to the longitudinal axis X—X of the vehicle i.e. an axis which is midway between the ground engageable propulsion means on either side of the vehicle and which intersects the axis of rotation of the front and rear ground engageable propulsion means. The crankshaft 52 provides a drive shaft of the engine.

If desired the engine may be of other type such as a rotary engine such as a Wankel engine or a turbine. In this case of the rotor shaft or the turbine shaft respectively provides the drive shaft.

Rotatably mounted within the angle drive housing 45 is an angle drive which, as best shown in FIG. 4, carries in suitable bearing means an input shaft 53 which is connected via a vibration damper 54 to the engine output, provided in this example by a flywheel 55 on the drive shaft 52. The angle drive also carries in suitable bearing means an output shaft 56 which is connected via the torque converter 44 to an input shaft 57 of the change speed gear train incorporated in the gearbox 43. The input and output shafts 53, 56 provide first and second shafts which have a bevel gear 53a, 56a respectively fixed relative thereto, in the present example by being formed integrally therewith, and which are interengaged to transmit torque between the engine and the gearbox and to turn the direction of drive through 90° from a longitudinal direction to a transverse direction.

If desired, the first and second shafts may be formed separately from the input and output shafts and may be connected to them in any suitable manner. If desired, the input and output shafts may rotate about different axes to the first and second shafts and, may be connected thereto by suitable gear means.

The output shaft 56 is connected by a quill shaft 58 to a hydraulic pump 59 bolted to the housing 45. Alternatively, the hydraulic pump 59 may be orientated in the dotted line position shown in FIG. 1 in which case the pump may be driven by the input bevel gear shaft.

Although in this example the torque converter 44 is housed by virtue of the transfer box 45 having an extension part 45a which provides a first torque converter housing part which cooperates with a second torque converter housing part 43a of the gearbox 43 to provide a housing for the torque converter 44, if desired, the torque converter housing part may be separate from and bolted to the transfer box 45. Moreover, the torque converter may be housed in any other desired manner so as to be operatively disposed between the change speed gear train and the angle drive or in another suitable disposition of the drive path such as between the engine and the angle drive or between the change speed gear train and the ground engaging propulsion means.

If desired, other forms of mechanical transfer means may be provided to transfer the drive between the engine and the gearbox.

The engine is provided with a suitable cooling radiator but not shown. If desired this may be provided in the space to the rear of the engine above the angle drive housing 45.

Although in the present example the engine 49 is disposed substantially wholly to the front of a longitudinal midpoint between the axis $R_F$ and $R_R$ and the gearbox and transfer box substantially wholly to the rear of such midpoint, if desired, the engine may be disposed at any desired longitudinal position between the wheels and the gearbox may be positioned at a desired longitudinal position of the machine with a suitable spacing mechanism or connecting mechanism being provided between the engine and the angle drive housing where the angle drive is connected to the gearbox as described hereinbefore. Alternatively, suitable means may be provided to connect the output of the transfer box to the input of the gearbox where these components are longitudinally offset.

The distance between the outside of the frame members 14, 15 may be not more than 30% of the overall width of the machine excluding the wheels and may be, for example, in the range 27%–30%.

An operator's cab 70 is mounted on the frame member 14 by vibration isolating mounts so that the cab 70 is supported on one side of the longitudinal axis X—X of the vehicle. The cab 70 has a front window 77a, a rear window 77b and two side windows 77c, 77d, the window 77c facing transversely across the machine. The or each window may be provided with a transparent closure element such as glass, or may be open, or may be provided with a protective element such as a grille or bars. A driver's seat, steering wheel S and other controls, not shown, are provided in the cab and the cab is provided with an access door or opening on the side in which the window 77d is provided.

A loader arm 80, has a longitudinal axis L—L which lies in a vertical plane which is parallel to a vertical plane containing the longitudinal axis X—X of the vehicle and offset therefrom towards the engine 49. The arm 80 is pivotally mounted, by means of axis member 81, between the frame members 14, 15 at the rear 13 of the vehicle for pivotal up and down swinging movement about a transverse horizontal axis H. The loader arm 80 is telescopic and comprises a rear outer section 82 which is pivotally connected to the frame members 14 and 15 by the axis 81 and a forward inner member 87 which is telescopically slidable within the section 82 under the control of hydraulic rams in conventional manner in the direction of the longitudinal axis L—L. At its front end the part 83 is provided with a downwardly and forwardly extending part 84 adapted to carry a material handling implement such as a loader bucket or lifting forks or other desired material handling means. If desired the loader arm may have more than two telescopically slidable sections or may not be telescopic. If desired ram means for telescoping two or more sections may be disposed externally of the section.

When the loader arm 80 is in its lowermost position, as shown in the figures, it lies in a well 90 of a minimum width which is slightly greater than the width of the loader arm, so as to provide a clearance therebetween. The well 90 is provided between the cab 70 and the frame member 15. In this lowermost position the arm is substantially horizontal but is inclined slightly downward in a forward direction.

The internal combustion engine 49 is disposed on the opposite side of the frame member 15 to the well 90 and thus is disposed on the opposite side of the longitudinal axis X—X of the vehicle to the cab 70.

Figure 3:
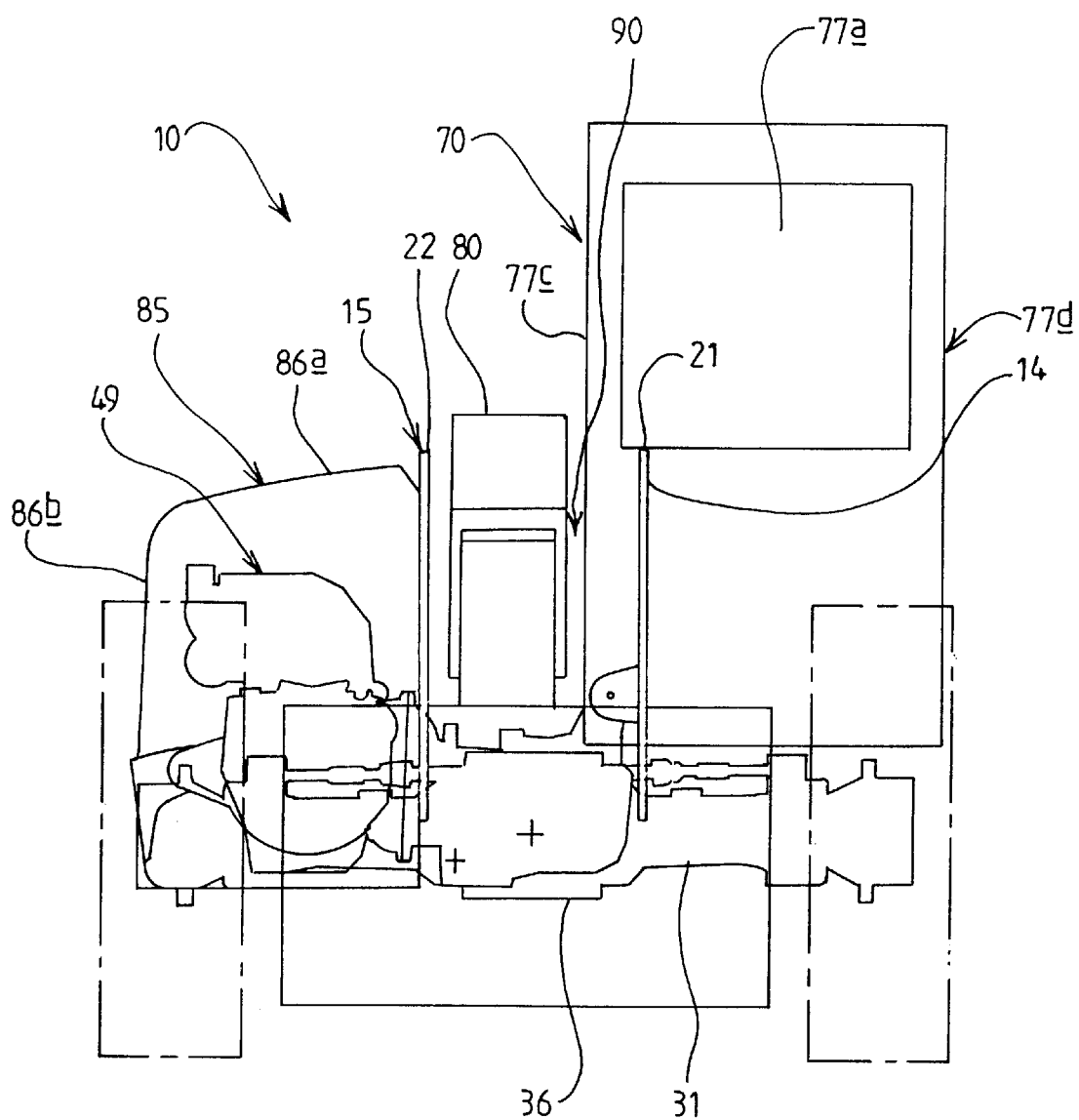
FIG. 3 is a front end view, with parts omitted for clarity, of the vehicle of FIG. 1.
Figure 6:
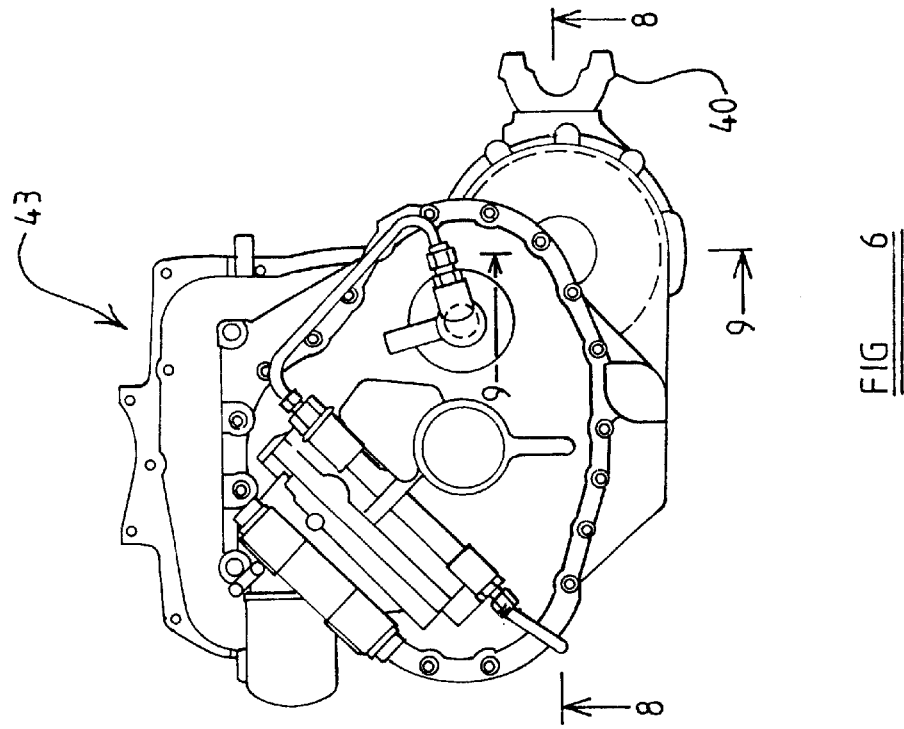
FIG. 6 is an end view of the transmission unit of FIG. 5 looking in the direction of the arrow A.
Figure 5:
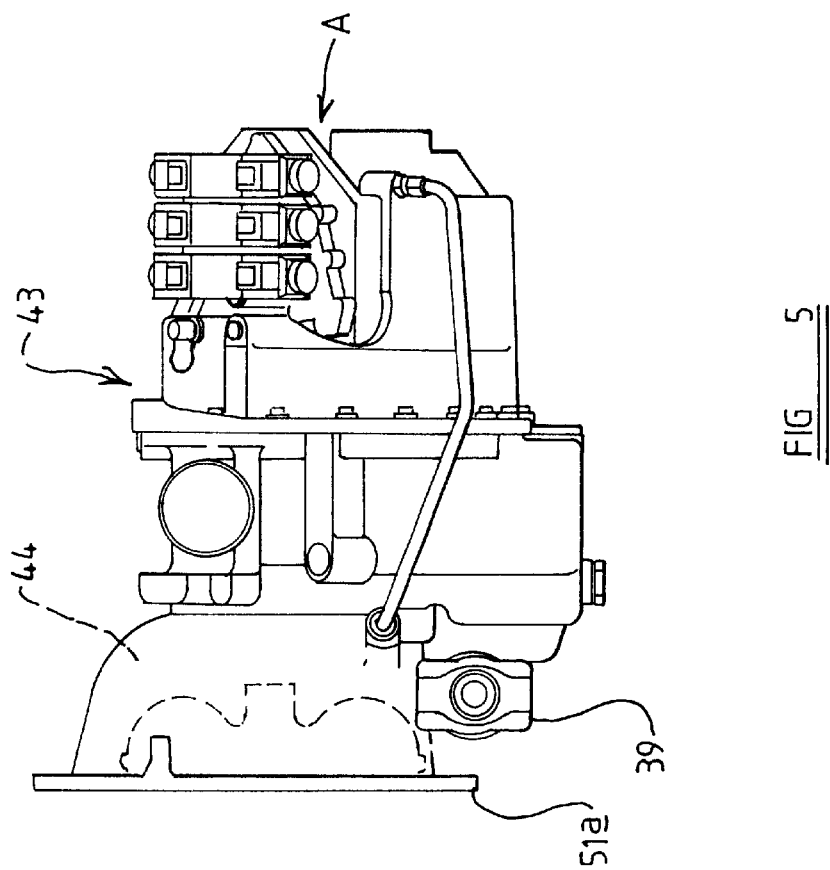
FIG. 5 is a side view of a gearbox and torque converter of a transmission unit for use in the vehicle of FIG. 1.
Figure 7:
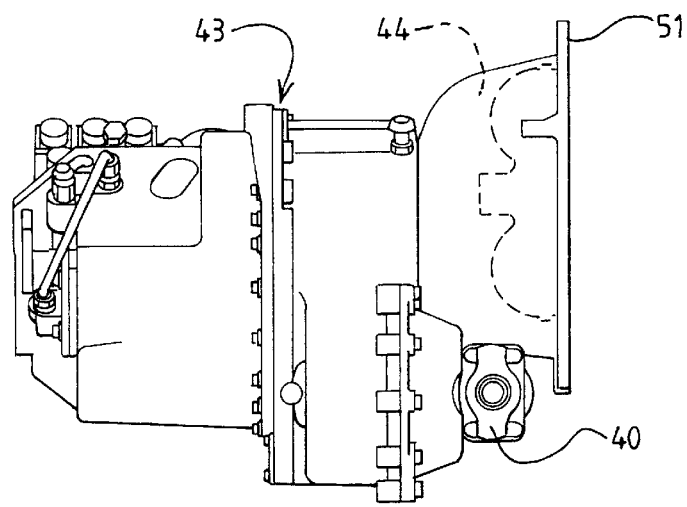
FIG. 7 is a side view of gearbox and torque converter parts of the transmission unit of FIG. 5.
Figure 8:
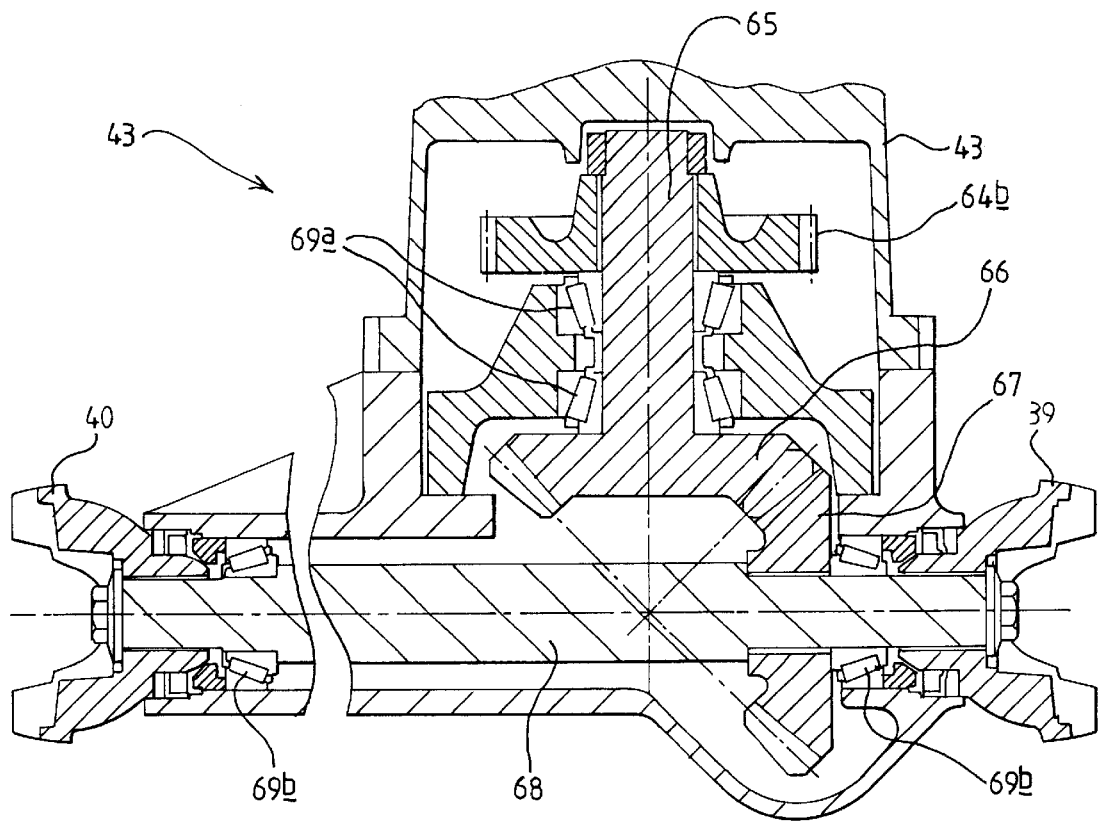
FIG. 8 is a section on the line 8—8 of FIG. 6.
Figure 9:
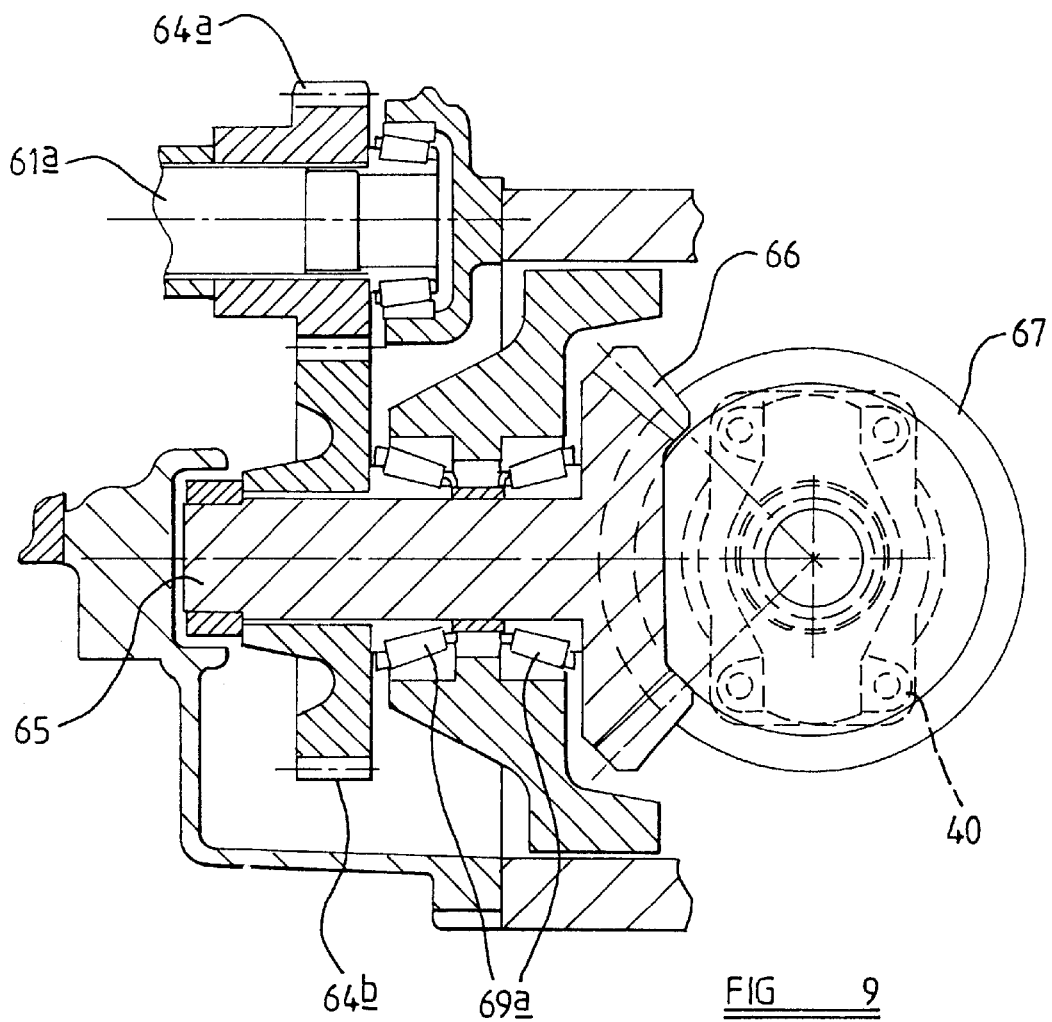
FIG. 9 is a section on the line 9—9 of FIG. 6.

The engine is disposed in a housing 85, the top 86a of which extends generally transversely away from the frame member 15 and is inclined generally forwardly and downwardly, as best shown in FIG. 3. At its transversely outer side the housing 85 has a generally vertical side surface 86b and, front and rear end faces 86c, 86d respectively. If desired, the housing may be of a different configuration than that described hereinbefore and may be wholly or partly omitted. The top of the housing is below the top of the loader arm or any telescoping ram therefor so that the housing does not obstruct the view of an operator transversely over the loader arm.

The engine 49 is so arranged that its crankshaft is parallel to the longitudinal axis X—X of the vehicle.

However, in another arrangement, if desired, the axis of rotation of the drive shaft of the engine may be arranged at an angle to the longitudinal axis X—X lying in the range $+z°$ to $-z°$ where z is 15° and preferably 10°. If desired the bevel gears 53a and 53b may be configured so as to maintain the axis of the gearbox at right angles to the longitudinal axis X—X whilst the axis of rotation of the drive shaft of the engine is varied as described above.

In the present example the radiator is provided with an hydraulically operated fan, but if desired, it may be provided with an electrically or mechanically operated fan to cause flow of cooling air of the radiator, suitable ventilation openings may be provided in the housing 72 for flow of such air. If desired the radiator may be positioned at another position on the vehicle, such as adjacent to the rear thereof.

The top of the loader arm 80 in a fully lowered position and at a location alongside the top of a steering wheel in the operator's cab is disposed wholly or substantially wholly below a horizontal plane which is not more than 1 meter, or preferably not more than 0.5 meter above the top of the steering wheel so that the driver's vision is substantially unobstructed by the loader arm. If desired, and as in the present case the top of the boom at said position is wholly below a horizontal plane containing the top of the steering wheel.

The loader arm in its lowered position may be horizontal or may extend forwardly and downwardly.

The loader arm may be telescopic in the direction of the longitudinal axis of the loader arm.

The longitudinal axis of the loader arm may in a substantially horizontal plane when the loader arm is in a position in which the implement engages a horizontal plane on which the ground engageable propulsion means are supported and, if the loader arm is telescopic, the loader arm is fully retracted.

In the specification by "substantially horizontal" we mean that the longitudinal axis is either in a horizontal plane or is in a plane which is inclined upwardly or downwardly to the horizontal at an angle lying the in the range of +5° to −25°.

The engine may be disposed so that at least a major portion of the engine is situated below a plane tangent to the top of the ground engaging propulsion means so as not to interfere with the view of an operator working in the operator's cab.

If desired, the wheels on the front axle may have a different track to the wheels of the rear axle.

If desired the ground engageable propulsion means may comprise endless tracks entrained about front and rear wheels in conventional manner.

By a "longitudinal axis of the vehicle" we mean an axis which passes through a mid point of the front wheel track and the rear wheel track of the vehicle.

The differential may be positioned on the front and rear axle as desired in order to minimize the respective propeller shaft angle.

Although in this specification the angle drive, torque converter, change speed gear train, and further angle drive have all been described as being disposed in a multi-part housing in which the parts are rigidly connected together to form a unitary transmission unit, if desired the unitary transmission unit housing may be made of a desired number of parts and may contain all the above mentioned components or one or other desired number of said components. The or each component not included in the transmission unit may be provided each as a separate unit or may be provided as a further transmission unit or units.

Although in the above example the engine has been described as having a crankshaft which lies parallel to the longitudinal axis of the vehicle and the gearbox as having an input shaft and an output shaft which lie at 90° to the longitudinal axis of the vehicle, it may be desired to orientate the engine or the gearbox at angles inclined to those mentioned above for example for improved access or to reduce drive shaft angle.

Accordingly in this specification the term "longitudinal" is used to mean a direction which is parallel to a vertical plane containing the longitudinal axis of the vehicle or a direction which inclined relative to said direction at an angle lying in the range of +x° to −x° and the term "transverse" is used to mean to a direction which is inclined at 90° to a vertical plane containing the longitudinal axis of the vehicle or which is inclined relative to said direction at an angle lying in the range +y° to −y° where x=15° and preferably 10° and y=15° or preferably 10°.

Although in the present example the engine is a reciprocatory engine having a crankshaft to provide the shaft, the engine may be a rotary engine such as a Wankel engine or a turbine, the rotor or turbine of which is mounted on a drive shaft of the engine.

Whilst in the example described the angle drive has comprised an input shaft and an output shaft mutually inclined at 90° and kinematically, mechanically or hydrostatically connected by gears the term "angle drive" is used herein to mean a drive having an input shaft and an output shaft which are kinematically connected in any suitable way for example mechanically or hydrostatically and which are mutually inclined at any desired angle.

In the present specification "comprise" means "includes or consists of" and "comprising" means "including or consisting of".

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilized for realizing the invention in diverse forms thereof.

What is claimed is:

1. A material handling vehicle including a structure having ground engageable propulsion means, a loader arm mounted on the structure for up and down swinging movement and, on opposite sides of the loader arm, an operator's cab and an engine having an output to provide power for said movement of the loader arm, and for propulsion of the vehicle and a drive to connect the output of the engine to the ground engageable propulsion means to propel the vehicle, wherein the drive includes an angle drive and a change speed gear train, the output of the engine is kinematically connected to an input of the angle drive and an output of the angle drive is kinematically connected to an input of the change speed gear train, and an output of the change speed gear train is kinematically connected to the ground engageable propulsion means wherein the output of the engine and the input of the angle drive are disposed longitudinally of the vehicle whilst the output of the angle drive is disposed transversely of the vehicle.

2. A vehicle according to claim 1 wherein the input of the change speed gear is disposed transversely of the vehicle and the output of the change gear train is disposed transversely of the vehicle.

3. A vehicle according to claim 1 wherein the drive means includes means for disconnecting the drive between the engine and the ground engageable propulsion means.

4. A vehicle according to claim 3 wherein said disconnecting means is disposed between the engine and the angle drive.

5. A vehicle according to claim 1 wherein the engine has a drive shaft which is disposed longitudinally of the vehicle.

6. A vehicle according to claim 1 wherein the change speed gear train is disposed in a housing comprising a gearbox.

7. A vehicle according to claim 1 wherein the angle drive and the change speed gear train are disposed in at least one housing, said at least one housing comprising a transmission unit.

8. A vehicle according to claim 1 wherein the vehicle comprises a chassis having a pair of spaced longitudinally extending frame members.

9. A vehicle according to claim 7, wherein the transmission unit is provided with at least one output which is kinematically connected to said ground engageable propulsion means.

10. A vehicle according to claim 9 wherein the at least one output is disposed on or parallel to a longitudinal axis of the vehicle.

11. A vehicle according to claim 9 wherein the transmission unit has a front output and a rear output.

12. A vehicle according to claim 11 wherein said outputs of the transmission units are provided at opposite ends of a shaft, which is driven by the output of the change speed gear train, and which is disposed longitudinally of the vehicle.

13. A vehicle according to claim 1 wherein the output of the change speed gear train is connected to an input of a further angle drive having an output which extends longitudinally of the vehicle.

14. A vehicle according to claim 9 wherein the output of the change speed gear train is connected to an input of a further angle drive having an output which is kinematically connected to said output of the transmission unit.

15. A vehicle according to claim 13 wherein the output of the further angle drive is disposed adjacent the engine.

16. A vehicle according to claim 15 wherein the further angle drive is disposed adjacent the engine.

17. A vehicle according to claim 9 wherein a vehicle comprises a front axle and a rear axle each having a ground engageable propulsion means and the propulsion means of at least one of said axles being connected to said at least one output of the transmission unit.

18. A vehicle according to claim 8 wherein the change speed gear train is disposed substantially within the chassis frame members and between axes of rotation of front and rear ground engageable propulsion means.

19. A vehicle according to claim 1 wherein the engine is spaced from the cab to define a well between the cab and the engine in which the arm, in a lowered position, can be at least partly accommodated.

20. A vehicle according to claim 8, wherein the engine is spaced from the cab to define a well between the cab and the engine in which the arm, in a lowered position, can be at least partially accommodated, and wherein the well is disposed between the chassis frame member.

* * * * *